US012774040B2

(12) United States Patent
Nomura et al.

(10) Patent No.: US 12,774,040 B2
(45) Date of Patent: Oct. 27, 2026

(54) VEHICLE BODY STRUCTURE

(71) Applicant: NISSAN NORTH AMERICA, INC., Franklin, TN (US)

(72) Inventors: Takayoshi Nomura, Zama City (JP); Jason Lyman, Whitmore Lake, MI (US); David Huynh, Windsor (CA)

(73) Assignee: NISSAN NORTH AMERICA, INC., Franklin, TN (US)

(*) Notice: Subject to any disclaimer, the term of this patent is extended or adjusted under 35 U.S.C. 154(b) by 390 days.

(21) Appl. No.: 18/478,891

(22) Filed: Sep. 29, 2023

(65) Prior Publication Data

US 2025/0108865 A1 Apr. 3, 2025

(51) Int. Cl.
*B62D 25/18* (2006.01)
*B62D 25/04* (2006.01)

(52) U.S. Cl.
CPC ............. *B62D 25/18* (2013.01); *B62D 25/04* (2013.01)

(58) Field of Classification Search
CPC ...... B62D 25/08; B62D 25/025; B62D 25/04; B62D 25/14; B62D 25/18; B62D 25/082; B60Y 2304/07
USPC .......................................................... 296/198
See application file for complete search history.

(56) References Cited

U.S. PATENT DOCUMENTS 5,061,009 A * 10/1991 Harasaki .............. B62D 25/081 296/192
5,311,960 A * 5/1994 Kukainis .............. B62D 25/142 296/70
6,371,551 B1 * 4/2002 Hedderly ............... B60K 37/10 296/192
6,761,394 B2 7/2004 Gennai et al.
6,824,204 B2 * 11/2004 Gabbianelli ....... B62D 25/2036 296/193.06
8,870,267 B2 * 10/2014 Zischke ............. B62D 25/2018 296/187.03
9,022,428 B2 * 5/2015 Balasundaramohan ..................... B62D 25/18 280/848
11,472,482 B2 * 10/2022 Tashiro ................ B62D 21/152
12,466,487 B2 * 11/2025 Merulla ............. B62D 25/2018
2005/0217913 A1 * 10/2005 Sakamoto .............. B62D 25/14 180/90
2005/0248185 A1 * 11/2005 Hayashi ................. B62D 24/02 296/193.07
2006/0186650 A1 * 8/2006 Kuwano ................ B60K 37/20 180/90
2014/0306490 A1 * 10/2014 Nydam .................. B62D 21/15 296/203.03

(Continued)

FOREIGN PATENT DOCUMENTS

CN 212290040 U 1/2021

*Primary Examiner* — Jason D Shanske
(74) *Attorney, Agent, or Firm* — Spencer Fane, LLP

(57) ABSTRACT

A vehicle body structure includes at least a first panel and an outboard dashwall panel. The first panel at least partially defines a lower portion of an A-pillar structure. The first panel has a lower forward portion with a flange attachment section. The outboard dashwall panel at least partially defines a rearward portion of a front wheel well. The outboard dashwall panel has an outboard end that includes an upper flange that extends in a forward direction from the outboard end and a lower flange that extends in a rearward direction from the outboard end. The upper flange and the lower flange are both fixedly attached to the first panel.

20 Claims, 7 Drawing Sheets

(56) References Cited

U.S. PATENT DOCUMENTS

| | | | | |
|---|---|---|---|---|
| 2022/0177041 | A1* | 6/2022 | Hong | B62D 25/025 |
| 2023/0025443 | A1* | 1/2023 | An | B62D 25/08 |
| 2024/0270316 | A1* | 8/2024 | Sasano | B62D 25/2018 |
| 2025/0136183 | A1* | 5/2025 | Yang | B62D 25/04 |
| 2025/0304183 | A1* | 10/2025 | Yun | B62D 27/023 |

* cited by examiner

VEHICLE BODY STRUCTURE

BACKGROUND

Technical Field

The present disclosure generally relates to a vehicle body structure. More specifically, the present disclosure relates to a vehicle body structure that includes an outboard dashwall panel with an upper flange that extends in a vehicle forward direction and lower flange that extends in a vehicle forward direction, both the upper and lower flanges extend from an outboard edge of the outboard dashwall panel.

Background Information

Vehicles are continuously being re-designed to improve responses to impact forces applied to areas of the vehicle during an impact event.

SUMMARY

One object of the present disclosure is to provide an outboard dashwall panel with a forward extending flange and a rearward extending flange that both extend from an outboard edge of the outboard dashwall panel and both attach to a first panel located between a front door opening and a wheel well of a vehicle body structure.

Another object of the present disclosure is to provide a structural connection between two panels that resists deformation in response to an impact event where the structural connection undergoes both compression and tension forces as a result of the impact event.

In view of the state of the known technology, one aspect of the present disclosure is to provide a vehicle body structure includes at least a first panel and an outboard dashwall panel. The first panel at least partially defines a lower portion of an A-pillar structure. The first panel has a lower forward portion with a flange attachment section. The outboard dashwall panel at least partially defines a rearward portion of a front wheel well. The outboard dashwall panel has an outboard end that includes an upper flange that extends in a forward direction from the outboard end and a lower flange that extends in a rearward direction from the outboard end.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
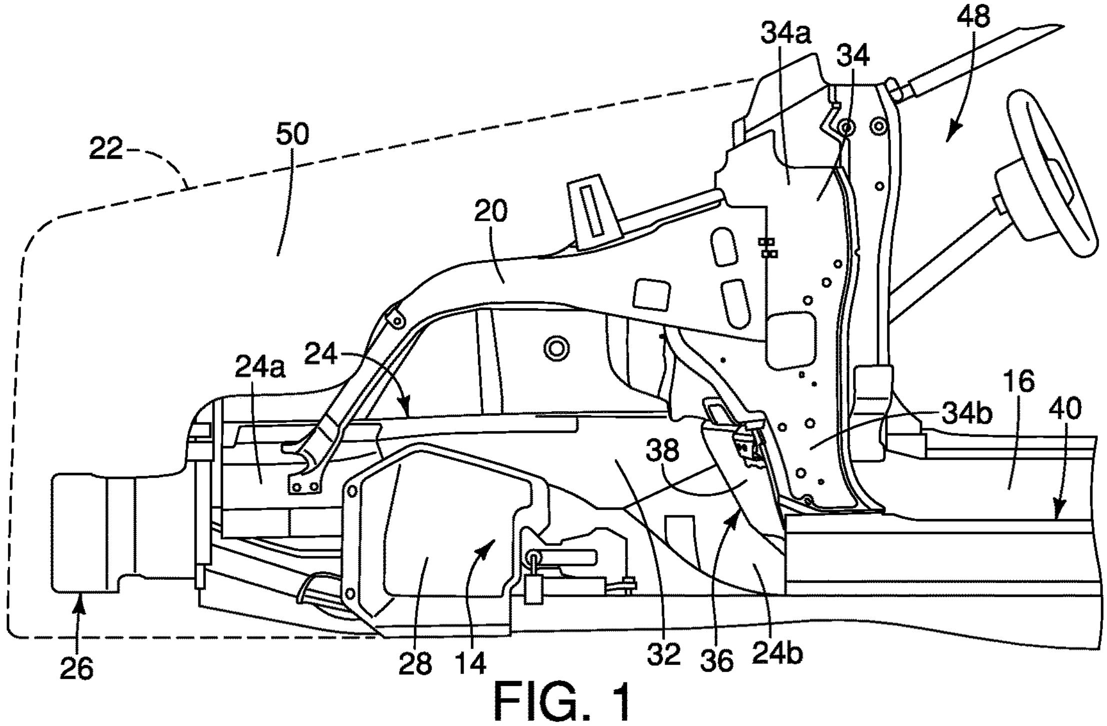
FIG. 1 is a side view of a vehicle with a fender and engine compartment components removed showing elements of a vehicle body structure including a first panel and an outboard dashwall panel fixedly attached to one another and a wheel well defined by the vehicle body structure in accordance with an exemplary embodiment.

Referring initially to FIG. 1, a vehicle 10 having a vehicle body structure 12 that includes various body panels welded to one another is illustrated in accordance with a first embodiment.

The vehicle body structure 12 defines a wheel well 14 and a front door opening 16, as shown in FIG. 1. The vehicle body structure 12 is assembled with a plurality of panels and/or beam elements welded together including at least a hood ledge 20, a hood 22, a front side member 24 that includes a forward end 24*a* and a rearward end 24*b*, a bumper assembly 26 attached to the forward end 24*a* of the front side member 24, a forward wheel well panel 28, a rearward wheel well panel 30 (FIG. 12 only), a side panel 32, an A-pillar panel 34 (also referred to as the first panel 34) having an upper end 34*a* and a lower end 34*b* and a dashwall panel 36 (FIG. 8) that includes an outboard dashwall panel 38. The vehicle body structure 12 further includes a door sill structure 40.

Since the hood ledge 20, the hood 22, the front side member 24, the bumper assembly 26, the forward wheel well panel 28, the rearward wheel well panel 30 (FIG. 12 only), the side panel 32 and the door sill structure 40 are basically conventional structures of vehicle body structures, further description thereof is omitted for the sake of brevity except where needed to more clearly understand the present invention.

Figure 2:
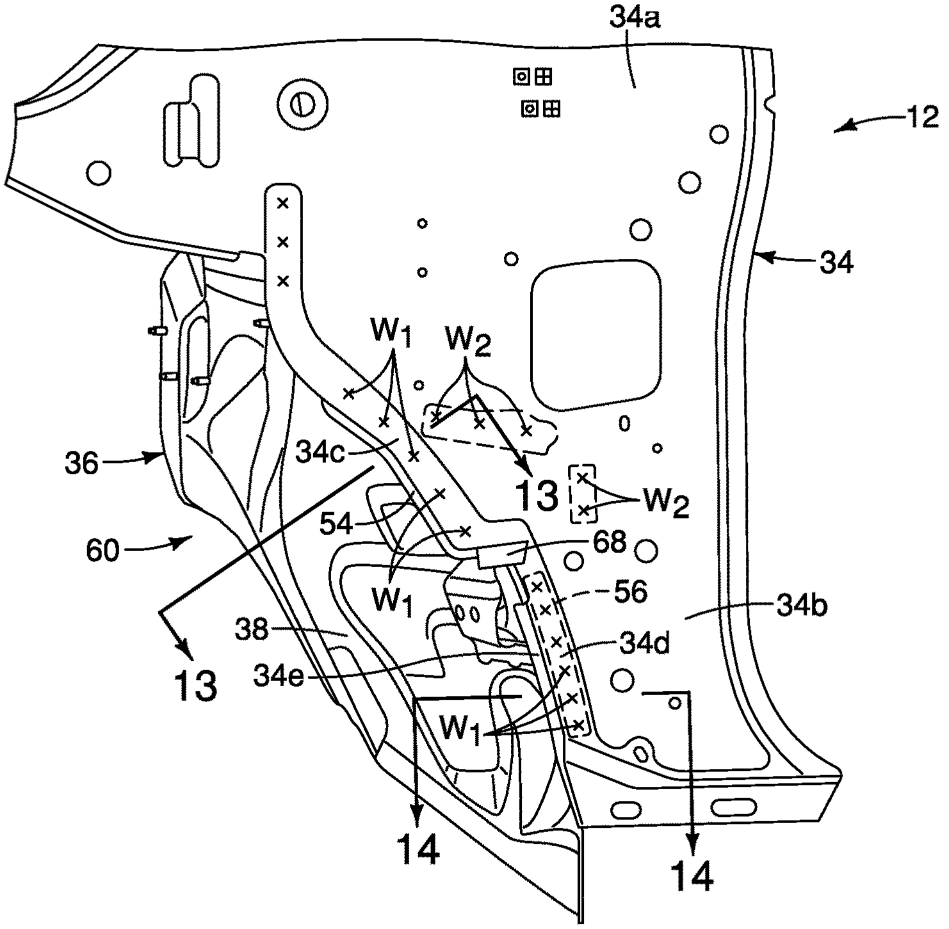
FIG. 2 is another side view of a portion of the vehicle body structure showing the areas where the first panel and the outboard dashwall panel are attached to one another in accordance with the exemplary embodiment.
Figure 3:
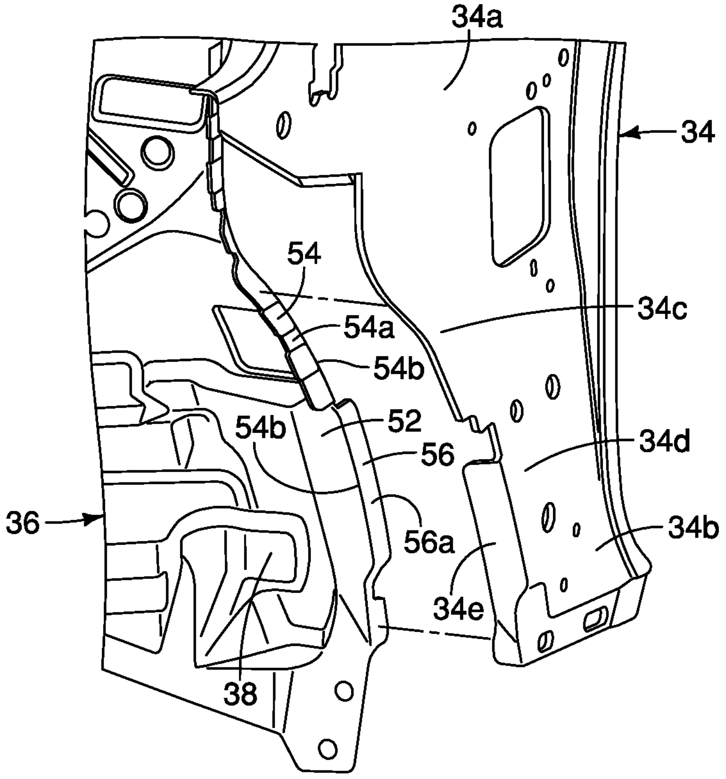
FIG. 3 is a perspective exploded view of a rearward area of the wheel well showing details of the first panel and the outboard dashwall panel aligned with and spaced apart from one another in preparation for attachment to one another in accordance with the exemplary embodiment.
Figure 4:
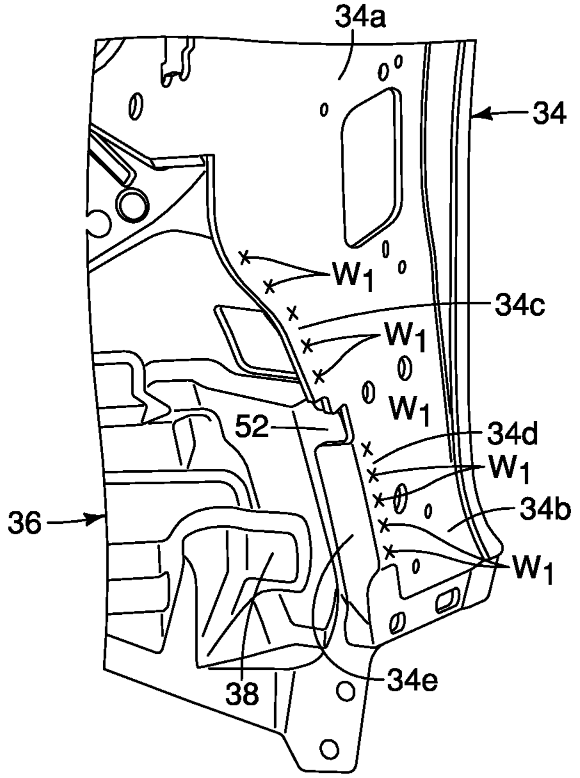
FIG. 4 is another perspective view of the rearward area of the wheel well showing details of the first panel and the outboard dashwall panel welded to one another to one another in accordance with the exemplary embodiment.
Figure 5:
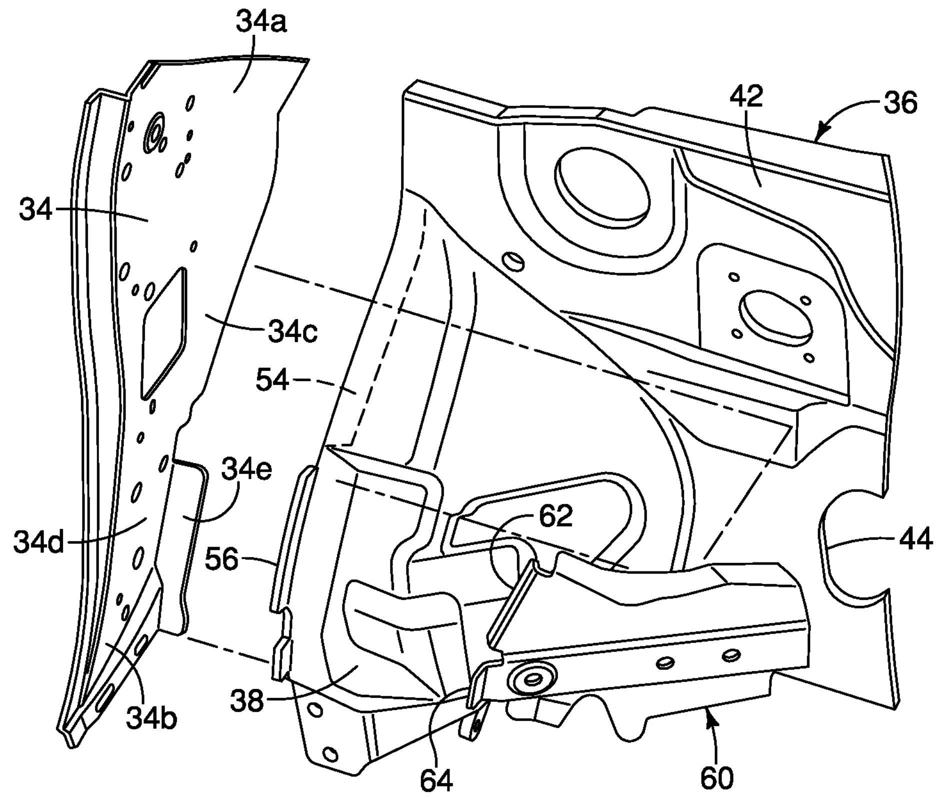
FIG. 5 is a perspective exploded view of the rearward area of the wheel well from within a passenger compartment of the vehicle showing details of the first panel, the outboard dashwall panel and a cross-member aligned with and spaced apart from one another in preparation for attachment to one another in accordance with the exemplary embodiment.

As shown in FIGS. 2-7, the A-pillar panel 34 (hereinafter the first panel 34) includes an upper end 34*a* and a lower end 34*b*. The upper end 34*a* is welded or otherwise fixedly attached to the outer dashwall panel 38 as well as other panels (not shown) that define an A-pillar structure of the vehicle body structure 12. As shown in FIGS. 4 and 5, the first panel 34 also has a lower forward portion 34*b* (the lower end 34*b*) formed with an upper flange attachment section 34*c*, a lower flange attachment section 34*d* and an attachment flange 34*e*. The purpose of the upper flange attachment section 34*c*, the lower flange attachment section 34*d* and the attachment flange 34*e* is described further below.

The attachment flange 34*e* extends in an inboard direction relative to the vehicle body structure 12. As shown in FIGS. 2-7, the lower end 34*b* of the A-pillar panel 34 (the first panel 34) is welded to flanges of the outboard dashwall panel 38, as described in greater detail below. The A-pillar panel 34 at least partially defines the lower portion of the A-pillar structure.

Figure 6:
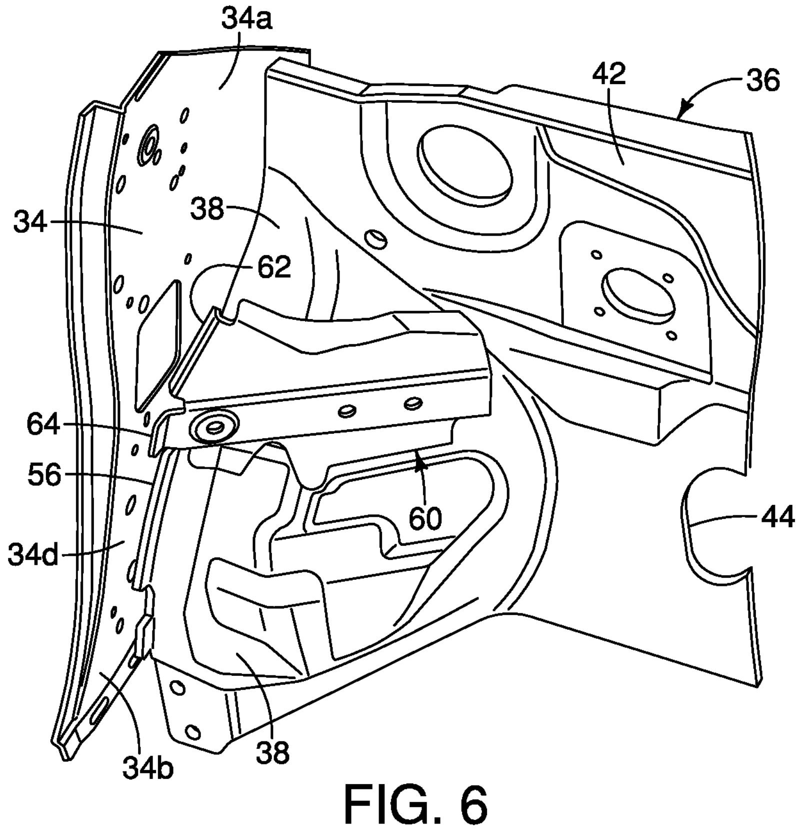
FIG. 6 is another perspective view of the rearward area of the wheel well from within the passenger compartment showing details of the first panel, the outboard dashwall panel and the cross-member welded to one another to one another in accordance with the exemplary embodiment.
Figure 7:
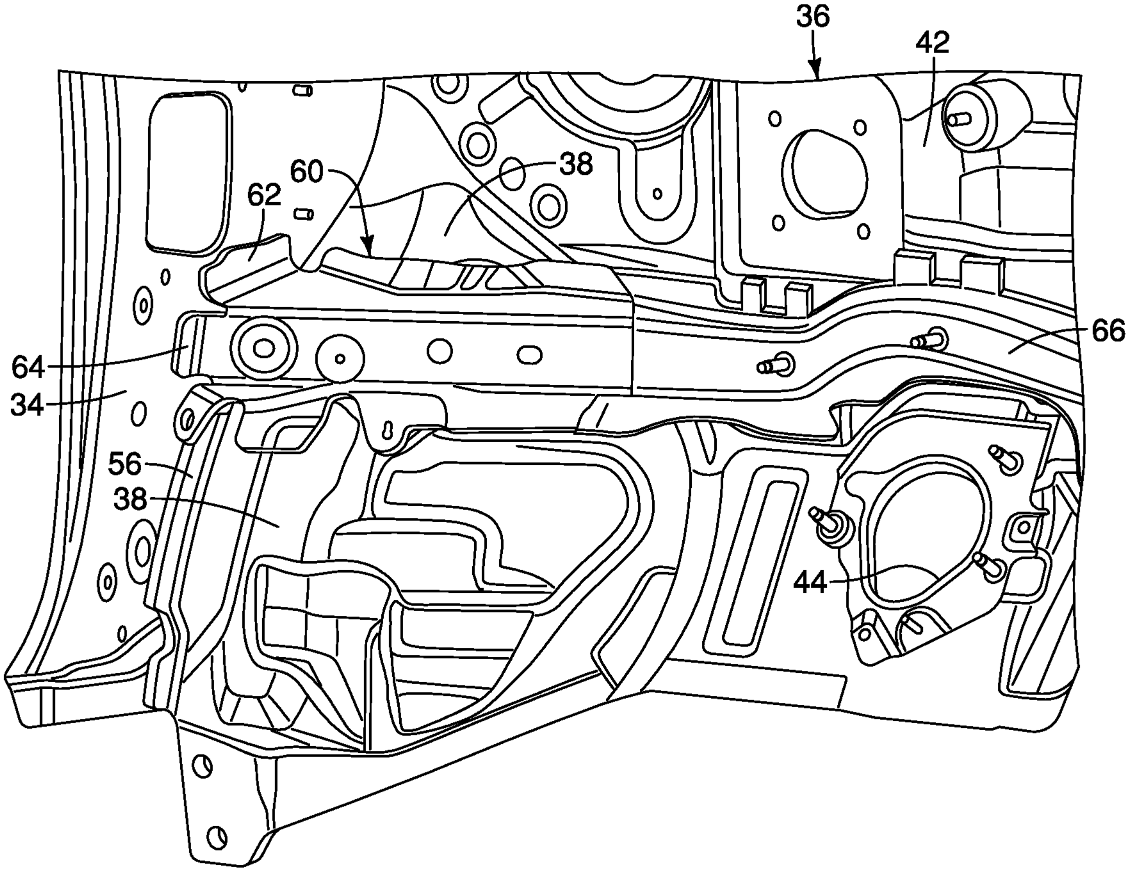
FIG. 7 is another perspective view of the rearward area of the wheel well from within the passenger compartment showing details of the first panel, the outboard dashwall panel, the cross-member and a central cross member welded to one another to one another in accordance with the exemplary embodiment.
Figure 8:
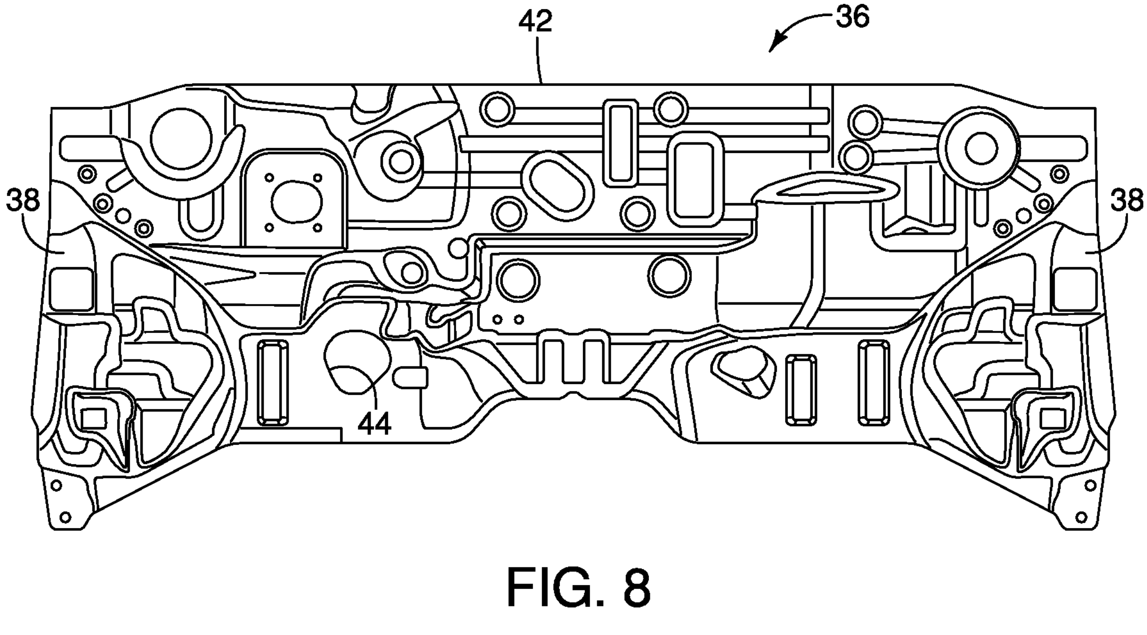
FIG. 8 is a rear view of all of a dashwall panel from within the passenger compartment, the dashwall panel including a central panel and two of the outboard dashwall panels shown removed from the vehicle in accordance with the exemplary embodiment.

As shown in FIGS. 5-8, the dashwall panel 36 can be a single panel or can be an assembly of several panels. For instance, the dashwall panel 36 can include a central panel 42 (or central section 42) and two outboard dashwall panel 38 (or sections 38) where the sections 38 and the central panel 42 are manufactured as a single panel. Alternatively, as shown in FIG. 8, the dashwall panel 36 can be manufactured from the central panel 42 and the two outboard dashwall panels 38 that are welded together to form the dashwall panel 36. Specifically, the central panel 42 (also referred to as the main dashwall panel 42) is welded to inboard portions of each of the outboard dashwall panels 38.

The two outboard dashwall panels 38 are basically identical except that they are preferably symmetrical mirror images of one another. Since the outboard dashwall panels 38 are identical, description of only one of the outboard dashwall panels 38 is provided herein for the sake of brevity, since description of one of the outboard dashwall panels 38 is basically the same as the other outboard dashwall panel 38.

As shown in FIG. 8, the dashwall panel 36 includes a variety of features, such as an opening 44 for a steering column (not shown) and various openings for wiring and attachment areas such that an instrument panel and air ducts (not shown) can be fixed thereto during the vehicle assembly process. The dashwall panel 36 also separates a passenger compartment 49 of the vehicle 10 from an engine compartment 50 of the vehicle 10, shown in FIG. 1. The outboard dashwall panel 38 and the flanges of the outboard dashwall panel 38 are described in greater detail.

As shown in FIGS. 3, 5, 9 and 10, the outboard dashwall panel 38 includes an outboard edge 52 (also referred to as an outboard end 52) of the outboard dashwall panel 38 is formed with an upper flange 54 and a lower flange 56. As shown in FIG. 1, the outboard dashwall panel 38 at least partially defines a rearward portion of the wheel well 14 (a front wheel well).

As shown in FIGS. 3, 5, 9 and 10, the upper flange 54 extends in a vehicle forward direction DF relative to the vehicle body structure 12 from the outboard end 52. The lower flange 56 extends in a vehicle rearward direction (opposite the vehicle forward direction $D_F$) relative to the vehicle body structure 12 from the outboard end 52.

Figure 9:
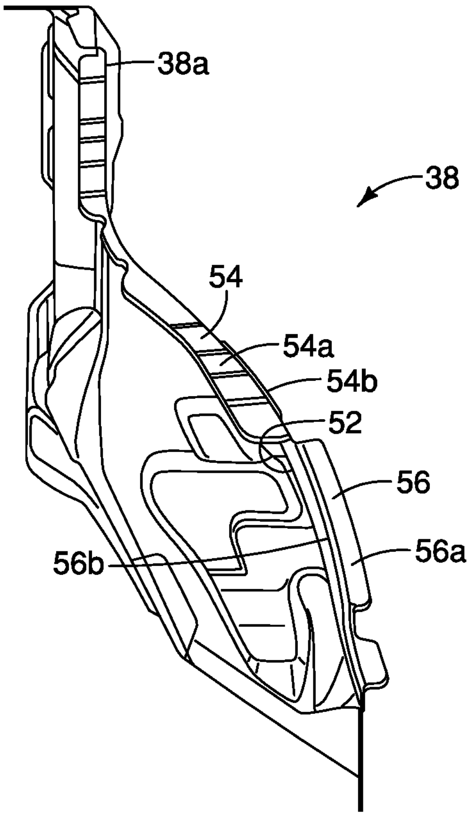
FIG. 9 is a first perspective view of the outboard dashwall panel removed from the vehicle body structure showing a wheel well side of the outboard dashwall panel, an upper flange and a lower flange in accordance with the exemplary embodiment.
Figure 10:
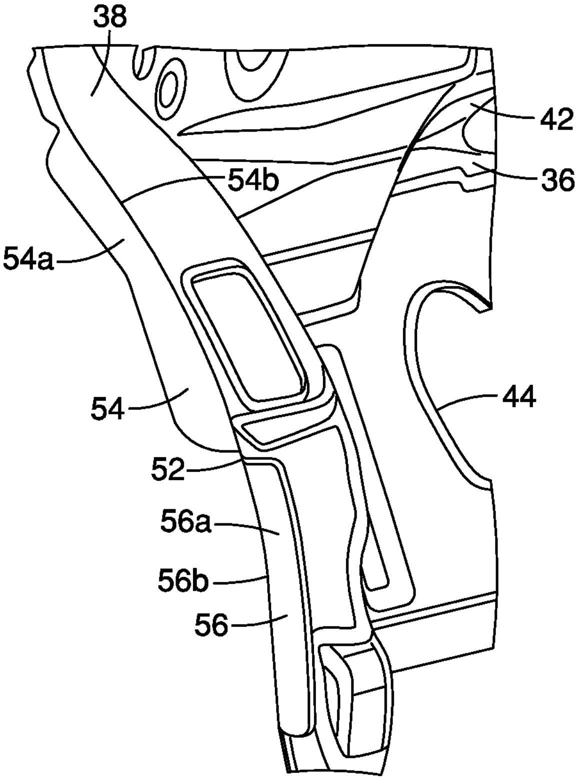
FIG. 10 is a second perspective view of the outboard dashwall panel removed from the vehicle body structure showing a passenger compartment side of the outboard dashwall panel, the upper flange and the lower flange in accordance with the exemplary embodiment.
Figure 11:
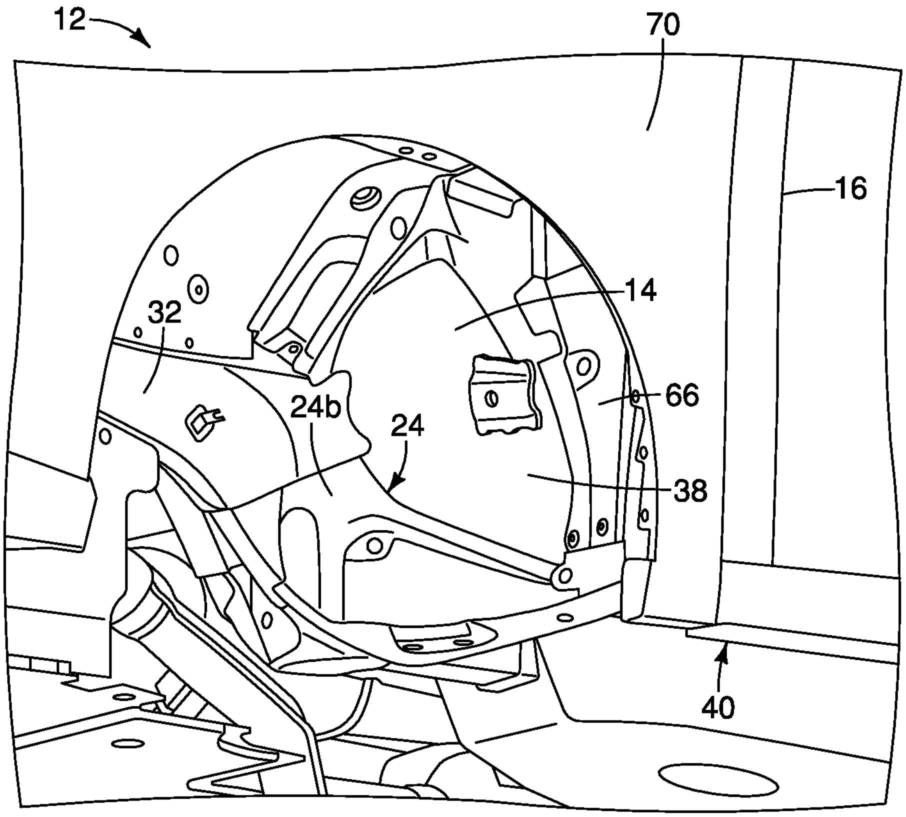
FIG. 11 is a perspective view of the wheel well with a fender attached to the vehicle body structure further defining the wheel well showing details of the first panel and other panels within the wheel well in accordance with the exemplary embodiment.

An outboard surface of the upper flange 54 is a generally planar surface 54*a*. However, an edge 54*b* of the planar surface 54*a* is curved. The curved edge 54*b* borders the outboard end 52 of the outboard dashwall panel 38, as shown in FIGS. 9 and 10. Therefore, the curved edge 54*b* (also referred to as the rearward edge 54*b*) of the upper flange 54 is a non-planar contoured edge.

An outboard surface of the lower flange 56 is also a generally planar surface 56*a*. However, an edge 56*b* of the planar surface 56*a* is curved. The curved edge 56*b* borders the outboard end 52 of the outboard dashwall panel 38, as shown in FIGS. 9 and 10. The curved edge 56*b* (also referred to as the forward edge 56*b*) of the upper flange 56 is a non-planar contoured edge.

As shown in FIGS. 9 and 10, the upper flange 54 of the outboard dashwall panel 38 is longer than the lower flange 56.

As shown in FIGS. 3 and 5, during assembly of the vehicle body structure 12, the upper flange 54 of the outboard dashwall panel 38 and the upper flange attachment section 34*c* of the first panel 34 are brought into alignment with one another and the lower flange 56 and the lower flange attachment section 34*d* of the first panel 34 are brought into alignment with one another. Thereafter, the upper flange 54 of the outboard dashwall panel 38 and the upper flange attachment section 34*c* of the first panel 34 are welded to one another forming welds $W_1$. Similarly, the lower flange 56 and the lower flange attachment section 34*d* of the first panel 34 are welded to one another forming welds $W_1$. The upper flange 54 and the lower flange 56 are welded, respectively, to the upper flange attachment section 34*c* and the lower flange attachment section 34*d* of the first panel 34 from an outboard side of the first panel 34.

Figure 14:
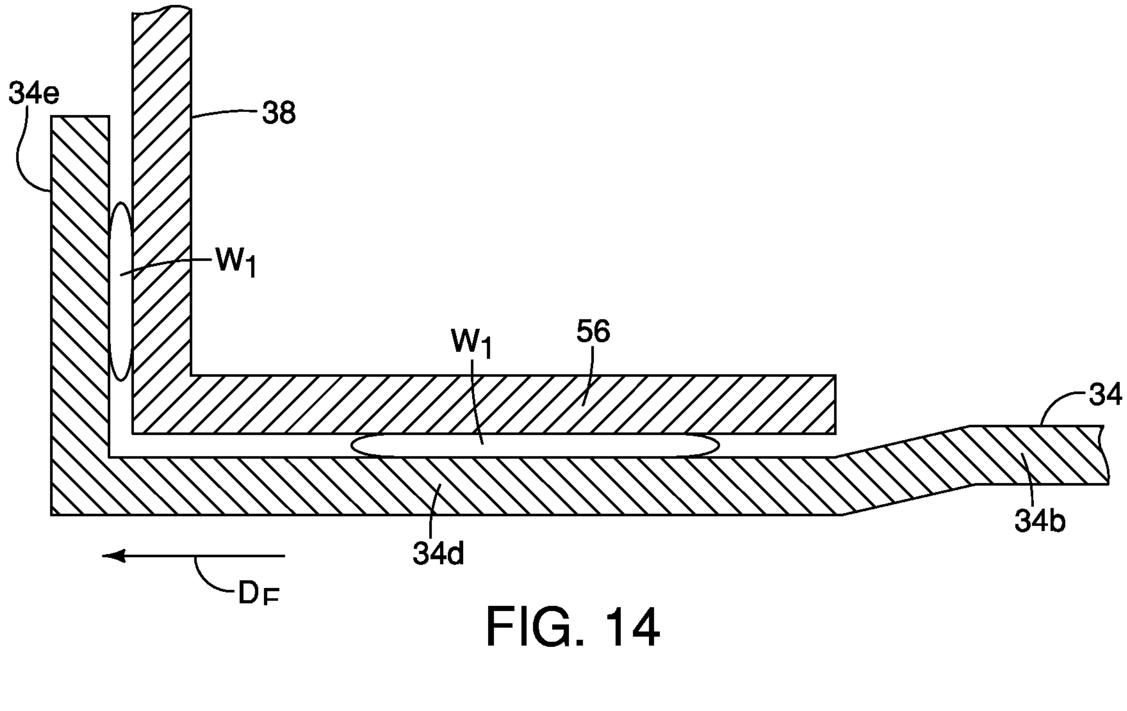
FIG. 14 is a cross-sectional view of the lower flange of the outboard dashwall panel and the lower flange attachment section of the first panel taken along the line 14-14 in FIG. 2, in accordance with the exemplary embodiment.

As shown in FIGS. 4 and 14, the attachment flange 34*e* of the first panel 34 extends in an inboard direction along the outboard dashwall panel 38 proximate the lower flange 56. The outboard dashwall panel 38 can optionally be welded to the outboard dashwall panel 38, as shown in FIG. 14.

Thereafter as shown in FIGS. 5-7, an outboard cross member 60 with an upper flange 62 and a lower flange 64 is attached to the outboard dashwall panel 38, for instance, by welding. As shown in FIG. 2, the welds $W_2$ weld the upper flange 62 and the lower flange 64 of the outboard cross member 60 to the first panel 34. A central cross member 66 is attached to the outboard cross member 60, the central panel 42 of the dashwall panel 36.

As shown in FIG. 2, a sealing material 68, such as a sealing tape or mastic material, is installed to the first panel 34 covering a small gap between the upper flange 54, the lower flange 56 of the outboard dashwall panel 38 and the first panel 34.

Figure 12:
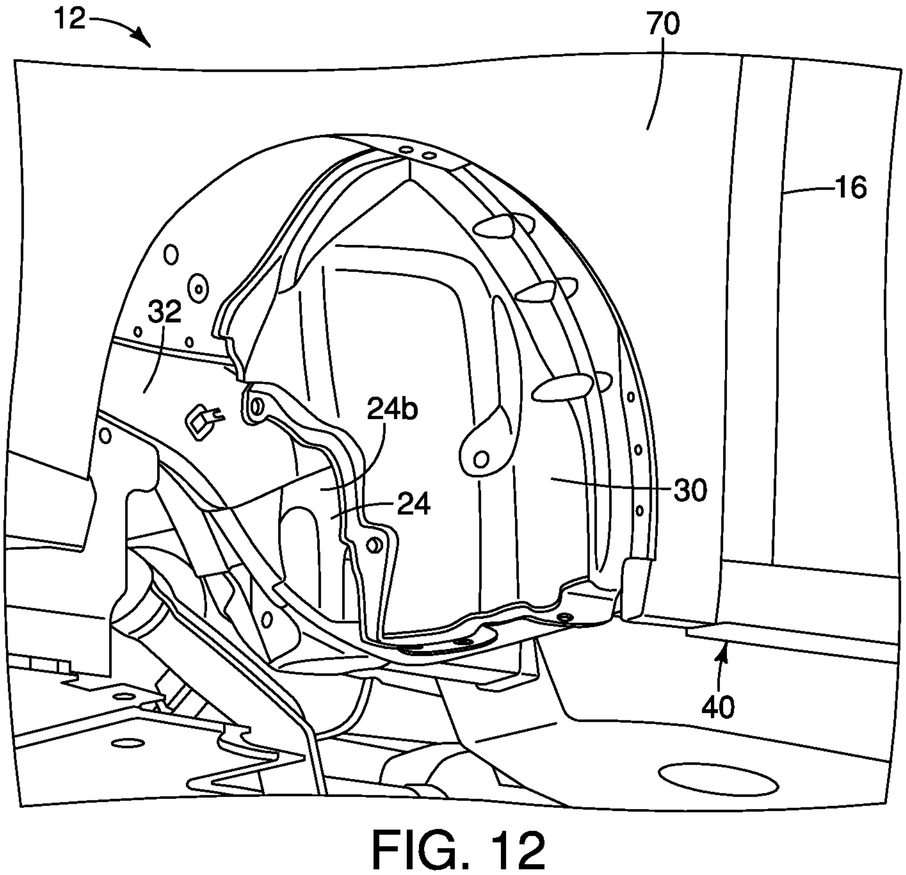
FIG. 12 is another perspective view of the wheel well similar to FIG. 11 showing a rearward wheel well panel covering the first panel and portions of other panels within the wheel well in accordance with the exemplary embodiment.
Figure 13:
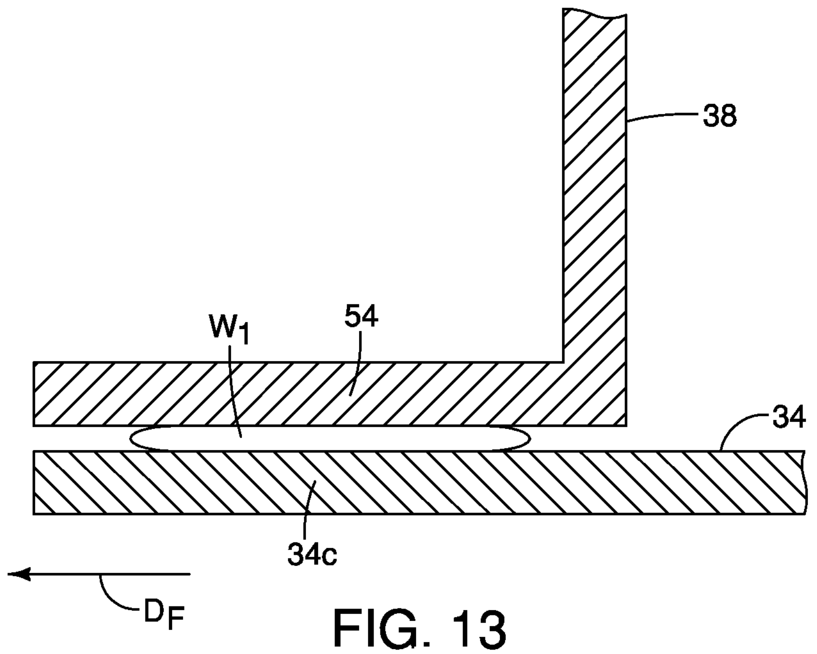
FIG. 13 is a cross-sectional view of the upper flange of the outboard dashwall panel and the upper flange attachment section of the first panel taken along the line 13-13 in FIG. 2, in accordance with the exemplary embodiment.

A front fender 70 is installed to the vehicle body structure 12 covering many of the above described panels, as shown in FIG. 12. The front fender 50 defines a semicircular wheel recess open to the wheel well 14. Preferably, the front fender 70 is fixedly attached to and partially covers the first panel 34. The wheel well panel 30 is positioned within the front wheel well 14 and attached to the fender 70, the outboard dashwall panel 38 and other panels within the wheel well 14. The wheel well panel 30 is preferably made of non-metallic materials and has some flexibility.

As is shown in FIG. 6, the lower flange 56 is entirely below the cross member 60. Further, the first panel 34 is at least twice the thickness of the outboard dashwall panel 38. For example, the first panel 34 can be 2.0 mm thick and the outboard dashwall panel 38 can be between 0.75 mm and 1.0 mm.

The upper flange 54 and the lower flange 56 extend in opposite directions. Specifically, the upper flange 54 extends in the vehicle forward direction $D_F$ and the lower flange 56 extends in a vehicle rearward direction (opposite the vehicle forward direction $D_F$). The upper flange 54 and the lower flange 56 are basically co-planar in order to mate with and weld to the upper flange attachment section 34*c* and lower flange attachment section 34*d* of the first panel 34. However, since the upper flange 54 and the lower flange 56 extend in opposite directions from the outboard dashwall panel 38, their respective attachments to the first panel provide a range of response in response to impacting forces from an impact event.

For example, an impact event where the impact forces are directed to a forward area of the vehicle 10 proximate the front wheel well 14 and forward of the upper flange 54 and the lower flange 56 (an off-center impact event), the impacting force results in tensile forces being applied to the welds $W_1$ that bond together the upper flange 54 and the upper flange attachment section 34*c* of the first panel 34. Conversely, the impacting force results in compressive forces being applied to the welds $W_1$ that bond together the lower flange 56 and the lower flange attachment section 34*d* of the first panel 34.

The converse is true for impacting forces being directed to the A-pillar from the rear of the vehicle. Specifically, in response to an impact from a rearward area of the vehicle to the front door area of the vehicle 10, an impact event where the impact forces are directed to a rearward area of the vehicle 10 (rearward of the front wheel well 14 and forward of the upper flange 54 and the lower flange 56), the impacting force results in compressive forces being applied to the welds $W_1$ that bond together the upper flange 54 and the upper flange attachment section 34*c* of the first panel 34. Conversely, the impacting force results in tensile forces being applied to the welds $W_1$ that bond together the lower flange 56 and the lower flange attachment section 34*d* of the first panel 34.

The split configuration of the upper flange 54 relative to the lower flange 56 provides a bond between the first panel 34 and the outboard dashwall panel 38 that is significantly stronger than the bond between the first panel 34 and the outboard dashwall panel 38 where the outboard dashwall panel 38 is provided with a single flange that is welded to the first panel 34.

The vehicle body structure includes many elements, beams and panels (other than the first panel 34 and the outboard dashwall panel 38) are conventional components that are well known in the art. Since these conventional components are well known in the art, these structures will not be discussed or illustrated in detail herein. Rather, it will be apparent to those skilled in the art from this disclosure that the components can be any type of structure that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle body structure. Accordingly, these terms, as utilized to describe the present invention should be interpreted relative to a vehicle equipped with the vehicle body structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle body structure, comprising:

a first panel that at least partially defines a lower portion of an A-pillar structure, the first panel having a lower forward portion having a flange attachment section; and an outboard dashwall panel that at least partially defines a rearward portion of a front wheel well, the outboard dashwall panel having an outboard end that includes an upper flange that extends in a forward direction from the outboard end and a lower flange that extends in a rearward direction from the outboard end, the rearward direction being opposite the forward direction, the upper flange and the lower flange both being fixedly attached to the first panel, and the upper flange and the lower flange being coplanar.

2. The vehicle body structure according to claim 1, wherein the upper flange of the outboard dashwall panel is longer than the lower flange.

3. The vehicle body structure according to claim 1, wherein the upper flange of the outboard dashwall panel and adjacent portions of the outboard end have a planar attachment surface and non-planar contoured edge.

4. The vehicle body structure according to claim 3, wherein the non-planar contour of the upper flange of the outboard dashwall panel is a curved contour.

5. The vehicle body structure according to claim 3, wherein the lower flange of the outboard dashwall panel has a generally planar shape.

6. The vehicle body structure according to claim 1, wherein the first panel includes an inboard extending flange that overlaps an area of an outboard section adjacent to the lower flange.

7. The vehicle body structure according to claim 1, further comprising a main dashwall panel attached to an inboard portion of the outboard dashwall panel.

8. The vehicle body structure according to claim 7, further comprising a cross-member rigidly fixed to each of the first panel, the outboard dashwall panel and the main dashwall panel.

9. The vehicle body structure according to claim 7, wherein the lower flange of the outboard dashwall panel is lower than the cross-member.

10. The vehicle body structure according to claim 1, further comprising a front fender defining a semicircular wheel recess open to the wheel well, the front fender being fixedly attached to and partially covering the first panel.

11. The vehicle body structure according to claim 10, further comprising a wheel well panel positioned within the front wheel well and attached to the fender and the outboard dashwall panel.

12. The vehicle body structure according to claim 10, wherein the upper flange of the outboard dashwall panel is longer than the lower flange.

13. The vehicle body structure according to claim 10, wherein the upper flange of the outboard dashwall panel and adjacent portions of the outboard end have a non-planar contour.

14. The vehicle body structure according to claim 13, wherein the non-planar contour of the upper flange of the outboard dashwall panel is a curved contour.

15. The vehicle body structure according to claim 14, wherein the lower flange of the outboard dashwall panel has a generally planar shape.

16. The vehicle body structure according to claim 15, wherein the first panel includes an inboard extending flange that overlaps an area of an outboard section adjacent to the lower flange.

17. The vehicle body structure according to claim 15, wherein the first panel has a first thickness and the outboard dashwall panel has a second thickness, the first thickness being at least twice the second thickness.

18. The vehicle body structure according to claim 1, wherein the upper flange and the lower flange are welded to corresponding portions of the first panel from an outboard side of the first panel.

19. The vehicle body structure according to claim 1, further comprising a seal tape that is applied to the outboard dashwall panel and the first panel along an area between the upper flange and lower flange.

20. The vehicle body structure according to claim 1, wherein the upper flange and the lower flange are each welded to a same surface of the first panel.

* * * * *